(12) United States Patent
Royle

(10) Patent No.: US 6,931,767 B2
(45) Date of Patent: Aug. 23, 2005

(54) FOOT COVER

(75) Inventor: Stephen Royle, Stockport (GB)

(73) Assignee: Footskins Limited, Stockport (GB)

( * ) Notice: Subject to any disclaimer, the term of this patent is extended or adjusted under 35 U.S.C. 154(b) by 0 days.

(21) Appl. No.: 10/344,780

(22) PCT Filed: Aug. 8, 2001

(86) PCT No.: PCT/GB01/03552
§ 371 (c)(1),
(2), (4) Date: Feb. 13, 2003

(87) PCT Pub. No.: WO02/13640
PCT Pub. Date: Feb. 21, 2002

(65) Prior Publication Data
US 2003/0154625 A1 Aug. 21, 2003

(30) Foreign Application Priority Data
Aug. 15, 2000 (GB) .............................. 0019949

(51) Int. Cl.[7] .............................................. A61D 9/00
(52) U.S. Cl. .............................. 36/111; 36/7.4; 119/850
(58) Field of Search .............................. 36/111, 7.3, 7.4; 119/850

(56) References Cited

U.S. PATENT DOCUMENTS

| | | | | |
|---|---|---|---|---|
| 858,031 A | * | 6/1907 | Schwarzschild ............... 36/7.4 |
| 866,423 A | * | 9/1907 | Bellatty ........................... 36/62 |
| 1,603,923 A | * | 10/1926 | Powers, Jr. .................... 36/7.4 |
| 1,729,816 A | * | 10/1929 | Binder ........................... 36/7.4 |
| 2,142,981 A | | 1/1939 | Richards | |
| 2,149,102 A | | 2/1939 | Quennard | |
| 2,446,371 A | * | 8/1948 | Jones ............................ 36/111 |
| 2,988,828 A | * | 6/1961 | Anderson ...................... 36/111 |
| 3,236,310 A | * | 2/1966 | Quick ........................... 168/18 |
| 4,103,439 A | | 8/1978 | Abramson ...................... 36/7.3 |
| 4,543,911 A | | 10/1985 | Marshall ......................... 119/1 |
| 4,981,010 A | | 1/1991 | Orza et al. | |
| 5,495,828 A | | 3/1996 | Solomon et al. ............. 119/850 |
| 5,926,888 A | | 7/1999 | Chen et al. ............. 12/142 EV |

FOREIGN PATENT DOCUMENTS

| | | |
|---|---|---|
| DE | 296 09 180 U1 | 5/1996 |
| DE | 299 19 155 U1 | 10/1999 |
| FR | 2 377 766 | 8/1978 |
| FR | 2 759 248 | 8/1998 |
| GB | 2 123 669 A | 2/1984 |

* cited by examiner

Primary Examiner—Ted Kavanaugh
(74) Attorney, Agent, or Firm—Pearne & Gordon LLP

(57) ABSTRACT

A foot cover comprising an elastically stretchable, homogeneous moulding having a foot-insertion opening which seals elastically to the leg above the foot in use.

8 Claims, 1 Drawing Sheet

FOOT COVER

This invention relates to foot covers.

Disposable overshoes are used in hospitals, clinics, operating theatres, clean rooms of manufacturing facilities and many other situations. There is essentially one type of product on the market, to meet requirements of such situations, which is a vaguely foot-shaped bag of a plastics film material or a non-woven textile, with an opening for the foot which has an elastic thread sewn into it. This type of product is not, in the first place, aesthetically pleasing, and is not ideal for walking, being somewhat loose and baggy.

There are, of course, more substantial overshoes, designed to protect footwear in inclement conditions, being essentially a rubber moulding having recognisable heel and sole portions with a shoe upper into which a shoe can be fitted, with some stretching of the thick rubber. These have somewhat the same structure as a rubber Wellington or ankle boot, and are not intended to be disposable, and are, indeed, not inexpensive.

There are no disposable foot covers for animals. Foot covers do exist for animals, in particular horses and cattle, but again they have a similar structure as a rubber Wellington boot. They are not intended to be disposable, and they are used for medicinal purposes and are, indeed, not expensive. Reference herein to "foot" is intended to include "hoof" or "paw".

The present invention provides a foot cover that is truly disposable, in being substantially less expensive even than the disposable overshoes above referred to, while also being more aesthetically pleasing both to wear and to look at, and much more comfortable to move about in. And, while being disposable, the foot cover of the invention can be made more durable than the currently available product, and useful in a wider variety of situations.

The invention comprises a foot cover comprising an elastically stretchable, homogeneous moulding having a foot-insertion opening which seals elastically to the shoe or leg above the foot, in use.

The foot insertion opening may be beaded.

The foot cover may be made of a dip-mouldable material, and may be of, or substantially of, natural rubber latex, polyvinyl chloride, neoprene, styrene composites or nitrile butyl rubber, for example.

The cover may be fashioned in the form of an overshoe, a boot or a sock, all for human wear. However, foot covers of the invention can also be fashioned for animal wear, adapted for animal hooves or paws. Cattle and horses have problems in muddy fields and to medically rectify damaged hooves they are often fitted with an overshoe which is, however, an expensive item and not in the least comfortable for the beast, with the consequence that the animal attempts to cast the device and can injure itself in the process. With a foot cover of the present invention, the animal would barely notice its presence, yet it would be perfectly protective and could be made to any desired degree of durability.

Great care and attention needs to be paid to the hooves of horses and cattle. The hooves deteriorate in wet, cold, damp, snowy and muddy conditions—they can even deteriorate from persistently standing in their own urine and manure. Horses hooves may then suffer from laminitis, white line disease, thrush and hoof cracks whilst cattle hooves may then suffer from mud fever and numerous forms of dermatitis. During snowy conditions both suffer from the cold and the hooves may "ball up" in the snow. With a foot cover of the present invention the animal would be less likely to suffer. Indeed, for those animals already suffering, the foot cover would provide relief, and can be used to great effect for protecting the remedial medical treatments of the conditions mentioned earlier.

The foot cover of the invention is similar in most respects to a disposable latex examination glove, inasmuch as it is of thin, highly stretchable rubber or like compound. Like rubber gloves, it may be internally powered, as with talc or corn starch, or internally polymer coated. It may be lined with a textile, for example, a woven or knitted cotton, or cotton flock The foot cover may have a textured or ribbed outer surface, especially on the sole and heel portions thereof, for grip.

It may be made sterile and presented in a sterile pack.

The wall thickness of the foot cover may well be about the same as latex examination gloves, though in view of the potentially heavier duty of a foot cover, heavier qualities will often be preferred. A typical range of wall thicknesses will be 0.2 to 1.2 mm. Lower portions of the foot cover may typically be thicker than the open ended higher portions.

The invention also comprises a method for making a foot cover comprising dipping a last shaped former into latex, drying the latex and stripping it from the former. By "latex" in this context is meant, of course, any dip coating material that will give similar elastic properties to natural rubber latex.

Embodiments of foot covers according to the invention will now be described with reference to the accompanying drawings, in which.

The drawings illustrate foot covers comprising an elastically stretchable, homogeneous moulding 11, having a foot-insertion opening 12 which seals elastically to the leg above the foot in use.

The foot insertion opening 12 is beaded, with an integral bead 13 of the same material as the moulding.

Any dip-mouldable material may be used, but natural latex rubber is entirely satisfactory, and is in plentiful supply and inexpensiive. Other materials may include nitrile butyl rubber neoprene, styrene composites and polyvinyl chloride.

Figure 1:
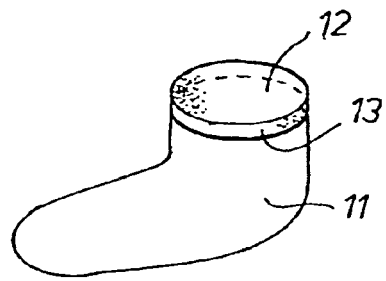
FIG. 1 is a view of a first embodiment (shoe cover)

The cover 11 illustrated in FIG. 1 is in the form of an overshoe. However, this is not the conventional form of rubber overshoe, which is of thicker, heavier construction and made usually by moulding in a form, rather than by dip-moulding, with built up heel and thick sole. Rather, this overshoe is more akin to a stretch latex examination glove, of essentially thin wall thickness and highly stretchable so as to fit tightly over a shoe and have the beaded foot-insertion opening snap back tightly around the leg or at least the ankle or shoe portion thereof.

Figure 2:
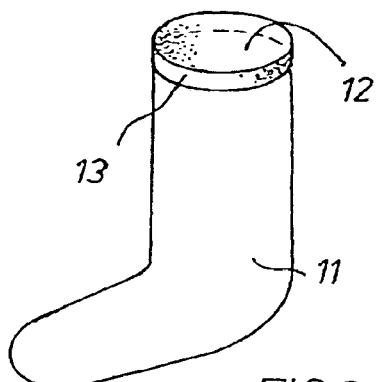
FIG. 2 is a view of a second embodiment (boot cover)

FIG. 2 illustrates a cover in the shape of a boot, essentially extending further up the leg of the wearer and providing additional waterproofing in sloshy conditions.

Because of the elastic extension of the covers, it should suffice, for human usage, to have but three sizes, large, small and children's.

Figure 3:
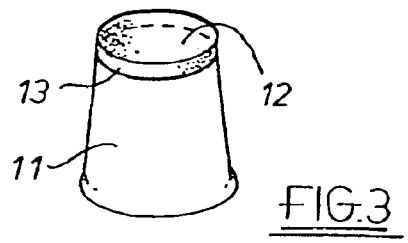
FIG. 3 is a view of a third embodiment (animal)

FIG. 3 illustrates a foot cover for animal use. Essentially, this is no more than a short cylinder bag, closed at one end, sized according to the animal concerned to fit snugly over its hoof, or, as the case may be, its paw, and snap closed at its beaded rim to form a waterproof cover and prevent roll down. Clearly, for heavier animals, heavier duty latex with thicker walls will be appropriate; a wall thickness, however, of only 1.2 mm or even less should provide adequate protection and be reasonably long lasting, readily withstanding a day's grazing.

For larger animals the bag may be ergonomically shaped to fit the hoof and lower leg. Two sizes should suffice for each kind of animal and the lengths of each will vary depending upon the specific application of the cover.

There is, of course, no reason why the FIG. 3 design should not be entirely suitable for human use, indeed, the simplicity of the design and the "one size fits all" aspect could make the FIG. 3 design the design of choice for certain aspects, at last, of human wear.

Exactly as for elastic latex examination gloves, the cover can be internally powdered, for lubrication for ease of donning and doffing, or be internally polymer, e.g. ptfe, coated for the same purpose. The cover may also be lined with a textile, e.g. a woven or knitted cotton or a cotton flock.

Also as with latex examination gloves, the external surface may be textured or ribbed, particularly at the sole and heel, for grip.

Particularly for hospital, clean room and food preparation use, the cover may be provided sterile, as by gamma irradiation, and in a sterile pack.

The covers are made essentially in the same manner as latex examination gloves, using a last former, however, instead of a hand former.

Figure 4:
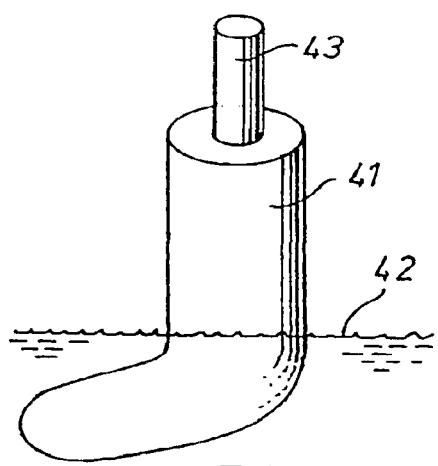
FIG. 4 is a view of a last former in a latex dipping operation.

FIG. 4 illustrates a shoe last shaped former 41 dipping into a latex bath 42. The former 41 has a long leg portion, and is suitable for making shoe and boot type covers, merely by adjusting the depth to which it is dipped into the latex. The eventual thickness of the cover is determined mainly by the consistency of the latex bath, which determines how much latex attaches to the former, and the length of time the latex is allowed to drain from the former. After dipping, the latex is dried on the former and eventually stripped from it.

Figure 5:
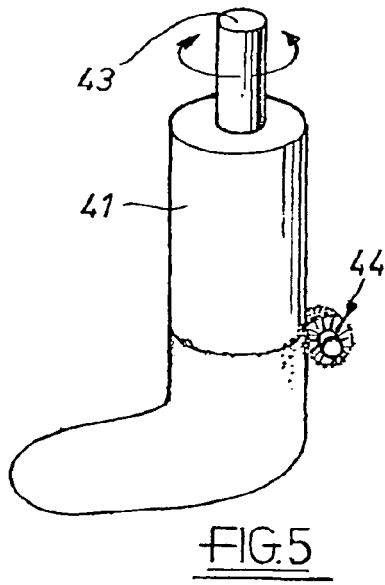
FIG. 5 is a view of a bead forming operation.

FIG. 5 illustrates the production of a beaded rim. The former 41 is mounted on a swivelling rod 43, which ensures even application of latex in the bath. After removal from the bath, and part drying, there is a somewhat ragged thin top edge to the moulding. This is rolled down by a rotary brush 44 as the rod 43 swivels so that the brush works on the entire periphery of the former. The former is then washed and sent through another drying or curing step, which consolidates the bead formed by the brushing.

Figure 6:
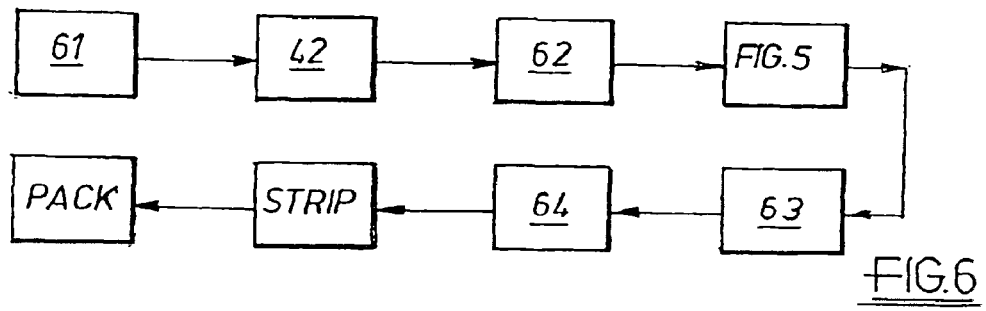
FIG. 6 is a block diagram of a manufacturing process.

As with latex examination gloves, a continuous production line can comprise a large number of formers on a conveyor (block diagram, FIG. 6).

Formers initially pass through a washing step 61 and a drying step 62 before being dipped in coagulant 63. The coagulant is then dried at step 64 before the formers enter the main dipping tank 42, from where the required amount of latex is deposited. The foot covers are dried under controlled conditions at step 65 to produce the correct level of tackyness. Automatic brush rollers are actuated which produce a bead on each of the foot covers (FIG. 5).

The foot covers are washed or leached at step 66 on line to remove any water soluble salts arising from the coagulant. If appropriate the foot covers are dipped into a solution of water and corn starch or similar powder at step 67 then subsequently dried under controlled conditions at step 68. The foot covers are at this stage subjected to controlled heat to initially remove excess water from the latex and then to subsequently cure or cross link/vulcanise the rubber film. The foot covers can then be manually removed from the formers at step 69 and sent for off-line inspection at step 71 then packing at step 72.

Foot covers as herein described have many advantages over conventional disposable overshoes, including improved waterproofing, much more aesthetic appearance and wear comfort, protection against chemicals, improved durability and lower cost. They can find application not only in those areas where conventional disposable overshoes are currently used, but also in sports, hobbies and pastimes such as angling, bowling and jogging, and as shoe protectors—convenient to carry around, much more so than conventional non-disposable overshoes—for inclement weather conditions. They can be provided to visitors to stately homes, churches, mosques and historic and archeological sites to protect the floor or ground, and can be used, in the boot format, instead of Wellington boots, for gardening and farming, as well as for water sports, where the tight fit and water sealing property would prevent water ingress. Many other uses can be imagined, and, within the general scope of the invention, variants of the basic idea will be apparent for particular end uses.

Foot covers as herein described for animals have numerous applications—disposable foot covers for animals do not presently exist. In particular, for horses and cattle, they will greatly reduce the chances of hooves suffering in, and due to, inclement and adverse weather conditions. They will have numerous medical uses for protecting hooves which have recently received medical attention and to hold dressings, creams, ointments and sprays in place in an uncontaminated manner.

What is claimed is:

1. A foot cover for a hoofed animal consisting of a moulding and a lining that is more lubricious than said moulding, said moulding and lining being formed of first and second polymers, said first polymer being different from said second polymer, said moulding being an elastically stretchable, flexible one-piece homogeneous moulding having a generally tubular shape extending from a closed end to a foot-insertion opening which seals elastically to a leg of said hoofed animal above the foot during use, said moulding having a wall thickness and a uniform polymer composition through said thickness over the entire extent of said moulding to provide said moulding as a seamless and joint-free continuous element, said lining being an interior polymer coating lining extending along the inside surface of said moulding, said lining having a wall thickness and a uniform polymer composition through said thickness over the entire extent of said lining to provide said lining as a seamless arid joint-free continuous element.

2. A foot cover as in claim 1, wherein said moulding is formed of said first polymer arid said lining is formed of said second polymer, and said second polymer is polytetrafluoroethylene.

3. A foot cover as in claim 1, wherein said first polymer is a dip-mouldable polymer.

4. A foot covering as in claim 3, wherein said dip-mouldable polymer is formed substantially of natural rubber latex.

5. A foot cover as in claim 4, wherein said moulding includes a bead adjacent said foot-insertion opening.

6. A foot cover as in claim 5, wherein said tubular shape is a cylindrical shape.

7. A foot cover as in claim 6, wherein said cylindrical shape is sized to cover an animal hoof and said wall has a thickness of from about 0.2 mm to about 1.2 mm.

8. A foot cover as in claim 5, wherein said moulding has an exterior having a textured or ribbed profile.

* * * * *

UNITED STATES PATENT AND TRADEMARK OFFICE
CERTIFICATE OF CORRECTION

PATENT NO. : 6,931,767 B2
DATED : August 23, 2005
INVENTOR(S) : Stephen Royle

It is certified that error appears in the above-identified patent and that said Letters Patent is hereby corrected as shown below:

Column 4,
Lines 46 and 49, delete "arid" and insert -- and --.

Signed and Sealed this

Twenty-first Day of March, 2006

JON W. DUDAS
*Director of the United States Patent and Trademark Office*